United States Patent [19]

Funakoshi et al.

[11] Patent Number: 4,522,679

[45] Date of Patent: Jun. 11, 1985

[54] APPARATUS FOR STICKING ADHESIVE FILM ON A RING AND A THIN ARTICLE

[75] Inventors: Keigo Funakoshi, Ibaraki; Minoru Ametani, Takatsuki, both of Japan

[73] Assignee: Nitto Electric Industrial Co., Ltd., Osaka, Japan

[21] Appl. No.: 629,877

[22] Filed: Jul. 11, 1984

[30] Foreign Application Priority Data

Sep. 13, 1983 [JP] Japan ................................ 58-170393

[51] Int. Cl.³ .......................... B26D 1/26; B32B 31/18
[52] U.S. Cl. ........................................ 156/510; 30/310; 83/490; 83/455; 83/564; 156/267; 156/523; 156/576; 156/577; 156/579
[58] Field of Search ............... 156/108, 267, 514, 510, 156/523, 576, 577, 579; 83/751, 772, 778, 490, 83/464, 455, 564; 30/300, 310

[56] References Cited

U.S. PATENT DOCUMENTS

| 1,527,763 | 2/1925 | Vance | 83/490 |
| 2,873,789 | 2/1959 | Ditter et al. | 156/523 |
| 3,971,691 | 7/1976 | Cairns | 156/577 |
| 4,050,971 | 9/1977 | Verkins et al. | 156/576 |
| 4,060,893 | 12/1977 | Matsuura | 83/490 |

*Primary Examiner*—Michael Wityshyn
*Attorney, Agent, or Firm*—Armstrong, Nikaido, Marmelstein & Kubovcik

[57] ABSTRACT

An apparatus for semiautomatically sticking an adhesive film on a silicon wafer and on a ring used as a carrier. After the ring and the silicon wafer have been manually positioned on tables, an adhesive film is automatically stuck on the ring and the silicon wafer. The excess portion of the film is then cut by hand along the ring and transversely. The apparatus greatly facilitates these works.

3 Claims, 7 Drawing Figures

APPARATUS FOR STICKING ADHESIVE FILM ON A RING AND A THIN ARTICLE

The present invention relates to a semiautomatic apparatus for sticking an adhesive film on a thin and fragile article such as a silicon wafer used as the substrate of an integrated circuit and on a ring used as a carrier for the thin article.

A silicon wafer is usually protected by a ring-shaped carrier for various treatments, held thereon by means of an adhesive film as shown in FIGS. 1 and 2. It has been a common practice to rely on hand labor in sticking an adhesive film on a ring-shaped carrier and sticking a silicon wafer on the back side of the adhesive film. The portion of the adhesive film protruding from the periphery of the ring has also been manually cut off. These manual works have required much labor. It required a skilled hand to stick without leaving wrinkles on the adhesive film.

It is an object of the present invention to provide a semiautomatic apparatus for sticking an adhesive film on a ring and on the adhesive film.

In accordance with the present invention, the ring and the thin article are placed in position by hand and the adhesive film is automatically stuck on the ring and the thin article. Although the excess portion of the adhesive film has to be manually cut, the apparatus obviates the necessity for a skilled hand in this work.

In accordance with the present invention there is provided an apparatus for sticking an adhesive film on a ring as a carrier and a thin article such as a silicon wafer comprising a frame; a table mounted on the frame for holding the ring thereon; a table mounted on the frame for holding the thin article thereon; sticking means adapted to move along the top surface of said tables for pressing the adhesive film against the ring and the thin article to stick it thereon; a cutter supporting frame pivotally mounted on the frame at one end thereof; cutting-out means mounted on the cutter supporting frame for cutting out the web of adhesive film along the outer periphery of said ring; and cutting means mounted on the cutter supporting frame for cutting the web of adhesive film transversely.

The ring and the thin article are placed on the tables and accurately positioned by hand. The work of sticking an adhesive film on the ring and the thin article, which is difficult to do accurately by hand, is done automatically so as to obviate the necessity for a skilled hand. The work of cutting out the web of adhesive film along the outer periphery of the ring and the work of cutting the web transversely can be done easily, accurately, and safely by hand i.e., by pressing the cutter against the adhesive film while moving the sliders along a guide rail or along the edge of a guide slot.

With the above-described object in view and as will become apparent from the following detailed description, the present invention will be more clearly understood in connection with the accompanying drawings, in which.

Figure 3:
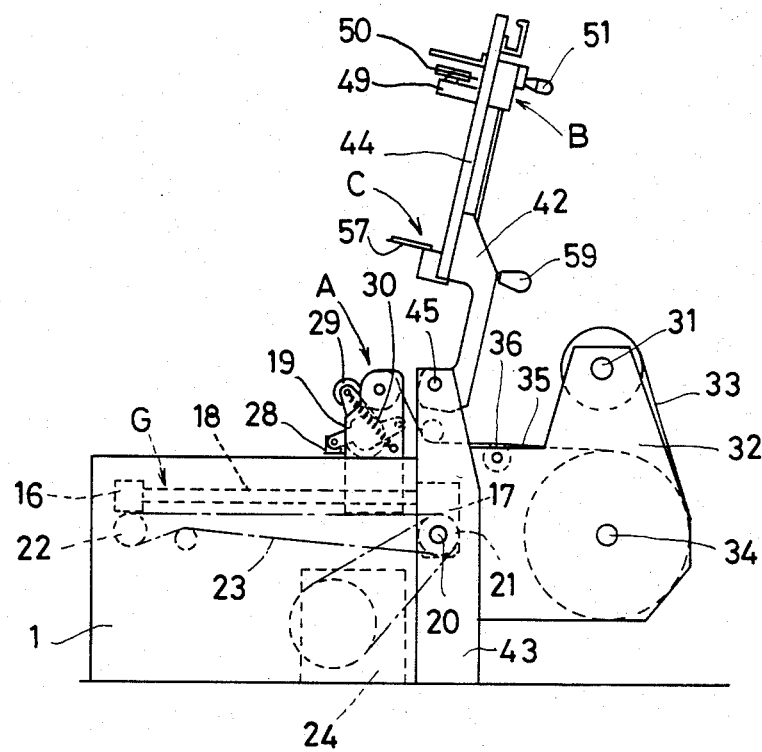
FIG. 3 is a side view of an embodiment of the present invention.
Figure 4:
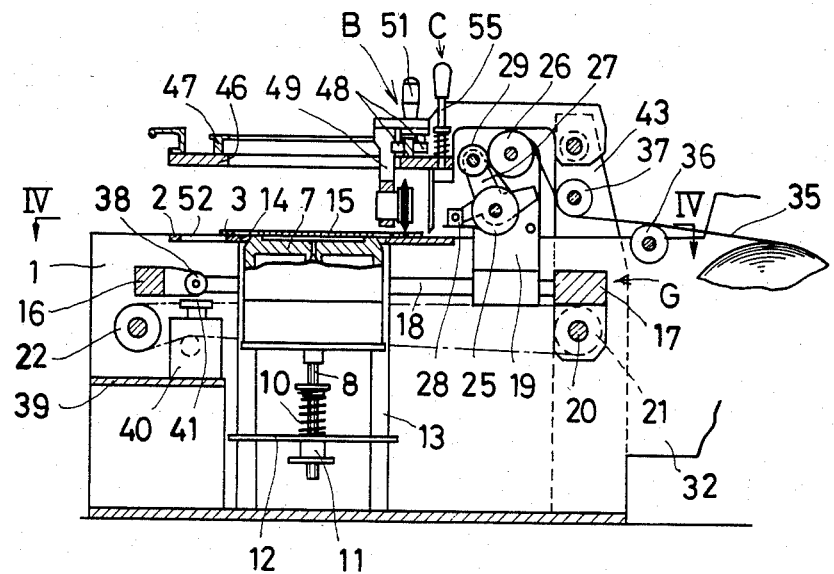
FIG. 4 is an enlarged sectional side view thereof.
Figure 5:
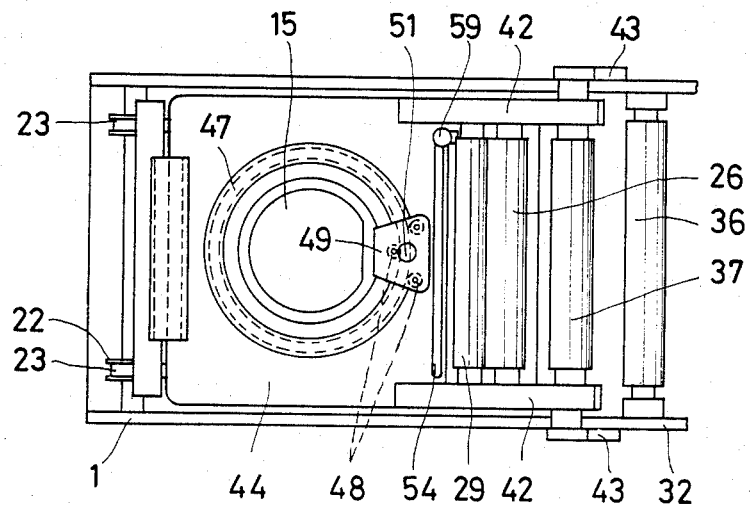
FIG. 5 is an enlarged plan view thereof.

Referring now to FIGS. 3 and 4, an apparatus in accordance with the present invention includes a frame 1, a ring supporting table 2 disposed at the upper portion of the frame 1 and supported by a plurality of poles 13, and a support plate 12 mounted on the poles 13.

Positioning pieces 4 and 5 are secured to the upper surface of the ring supporting table 2 to position a ring 3. (FIG. 6) They are thinner than the ring 3. The positioning piece 4 serves to receive the chordal edge 6 of the ring 3, while a pair of positioning pieces 5 serve to abut the diametrically opposite edges of the ring 3. In the alternative, recesses may be used in place of the positioning pieces 4 and 5.

A table 7 for supporting a thin article is disposed in a round opening 14 provided in the center of the ring supporting table 2. As shown in FIG. 4, the table 7 is cylindrical and has a leg 8 which slidably fits in a guide hole provided in the support plate 12. The table 7 is urged upwardly by a spring 10 so that its upper surface will be flush with that of the table 2. The upward movement of the table 7 is limited by a stopper 11. A suitable means for preventing the table 7 from turning on its axis is provided.

In order to position a thin article 15, either a shallow recess is provided in the upper surface of the table 7 or a mark is put thereon. If necessary, a plurality of suction holes for holding the thin article 15 in position on the upper surface of the table 7 may also be provided therein.

A guide frame G (FIGS. 3 and 4) provided at the upper part of the frame 1 comprises a pair of guide rails 18 joined at their ends by crosspieces 16 and 17. The crosspiece 17 is rotatably journaled on a driving shaft 20. Means A (FIG. 3) for sticking an adhesive film on the ring 3 and the thin article 15 is mounted on a pair of carriages 19, which in turn are slidably mounted on the guide rails 18.

A pair of timing pulleys 21 are fixedly mounted on both ends of the driving shaft 20 in the frame 1. Another pair of timing pulleys 22 are provided on the other end of the frame 1. A timing belt 23 travels around a set of the pulleys 21 and 22, while another timing belt 23 travels around another set of pulleys 21 and 22. Both ends of each timing belt 23 are secured to each carriage 19 so that the carriages 19 will be moved at the same time when the driving shaft 20 is driven by a reversible motor 24 (FIG. 3).

As shown in FIG. 4, the means A for sticking an adhesive film comprises a rubber roller 25 and a guide roller 26, both of which have their ends rotatably mounted on the carriages 19, a pair of rocker arms 27 secured to the shaft of the rubber roller 25, a suction type tape holder 28 and a tape press roller 29 mounted on each rocker arm 27. Each rocker arm 27 is urged by a spring 30 so as to selectively press the roller 29 against the roller 26 or pivot down the tape holder 28.

A pair of supporting plates 32 are provided on the front portion of the frame 1. A spindle 34 for winding a web of adhesive film 35 is detachably mounted on the supporting plates 32. Another spindle 31 is interlocked with the spindle 34 so that a separator 33 stuck beforehand on the web of adhesive film 35 will be separated therefrom and wound on the spindle 31. The spindle 31 may be omitted if a web of adhesive film with no separator is used.

The tape holder 28 is a hollow body provided with a lot of suction holes in its under surface and connected to a vacuum pump through a flexible pipe (not shown). When a selector valve (not shown) is operated, the adhesive film 35 is sucked on the under surface of the tape holder 28 with its adhesive surface facing downwardly.

As shown in FIG. 4, a roller 38 provided at the free end of the guide frame G is adapted to be pushed up by an elevator member 41 disposed under the roller 38 and adapted to be raised and lowered by an air cylinder 40 mounted on a stand 39.

A pair of mounting plates 43 are secured to the side faces of the frame 1 at its front end. A pair of arms 42 supporting a cutter supporting plate 44 are pivotally mounted on a shaft 45 at the upper ends of the mounting plates 43. (FIG. 3) An opening 46 (FIG. 4) is provided in the center of the cutter supporting plate 44 so as to be concentric with the opening 14 in the table 2 when the cutter supporting plate 44 is brought to the horizontal position. A circular guide rail 47 having a T-shaped section is provided along the edge of the opening 46. Means B for cutting out the web of adhesive film 35 along the ring 3 comprises three rollers 48, a slider 49 mounted on the guide rail 47 by means of the rollers 48, a round cutter 50 rotatably mounted on the slider 49, and a handle 51 provided on the slider 49. (FIGS. 3, 4, 5 and 7)

A means C for transversely cutting the web of adhesive film 35 comprises a vertical shaft 55 slidably inserted in a guide slot 54 (FIG. 3) transversely provided in the cutter supporting plate 44, a slider 56 (FIG. 7) secured to the lower end of the vertical shaft 55, a cutter 57 secured to the slider 56, a spring 58 having its one end abutting a collar provided on the vertical shaft 55 and the other end abutting the cutter supporting plate 44 so as to keep the slider 56 into contact with the under surface of the plate 44, and a handle 59 provided on the vertical shaft 55. The cutter 57 cuts into the adhesive film 35 when the handle 59 is pushed down against the resilience of the spring 58. The slider 56 is provided with a guide flange 60 kept in contact with the edge of the cutter supporting plate 44 so as to prevent the slider 56 from turning on its axis.

Figure 6:
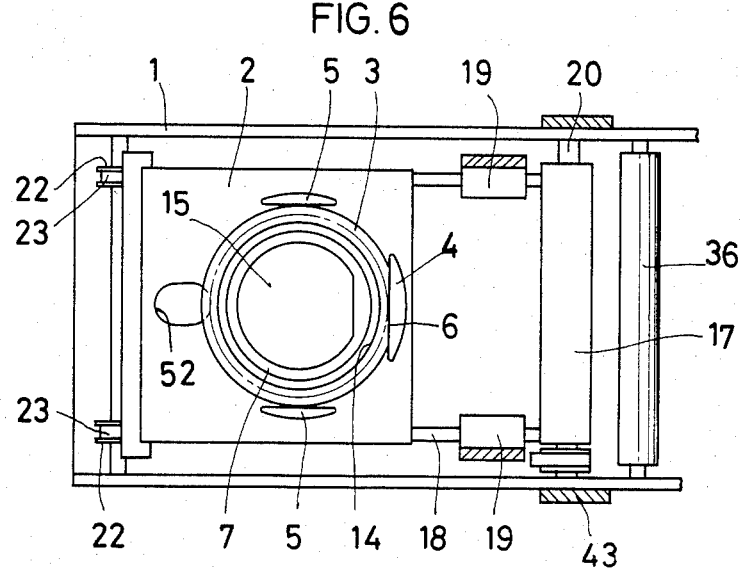
FIG. 6 is a plan view taken along line VI—VI of FIG. 4.
Figure 7:
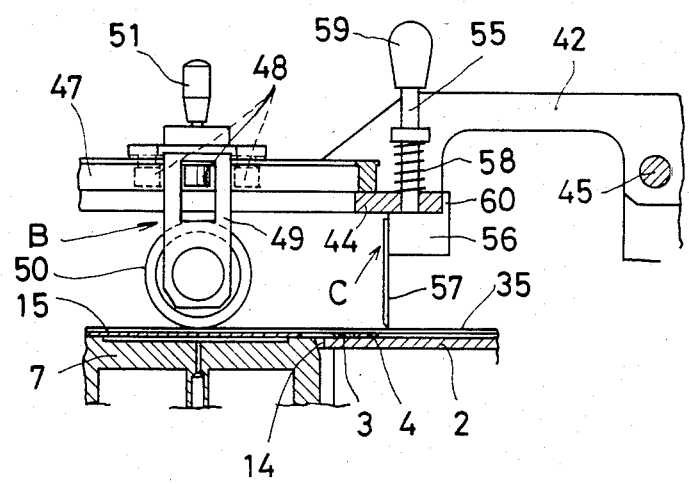
FIG. 7 is an enlarged side view in vertical section of a means for cutting the web of adhesive film transversely.

As shown in FIGS. 4 and 6, a finger hole 52 is provided in the ring supporting table 2 so that the ring 3 may be easily taken out after an adhesive film 35 has been stuck thereon.

In operation, with the cutter supporting plate 44 in its upper inoperative position shown in FIG. 3, a ring 3 is placed on the ring supporting table 2 and positioned by the positioning pieces 4 and 5 as shown in FIG. 6. Then a thin article 15 is placed on the table 7 and positioned. As desired, it may be held on the table 7 by vacuum suction.

The web of adhesive film 35 is set around the rollers as shown in FIG. 4, and the end of the web is held on the under surface of the tape holder 28 by suction with its adhesive surface facing down. Then the elevator member 41 actuated by the air cylinder 40 pushes up the roller 38 and thus the guide frame G so as to keep the rubber roller 25 of the sticking means A off the ring supporting table 2.

Then the reversible motor 24 is started so as to move the sticking means A in the leftward direction in FIG. 4 and thereby unwind the adhesive film 35 from the spindle 34. Simultaneously the separator 33 is peeled off the film and wound around the spindle 31.

Now the web of adhesive film 35 is stretched over the ring 3 and the thin article 15 placed on the tables 2 and 7, respectively. When the elevator member 41 is lowered by the air cylinder 40, the adhesive film 35 comes in contact with the upper surface of the table 2. The tape holder 28 is stopped applying sucking force to the end of the web 35. The motor 24 is then reversed so as to return the sticking means A to its original position. The adhesive film 35 is pressed by the rubber roller 25 against the ring 3 and the thin article 15 and is stuck thereon.

Figure 1:
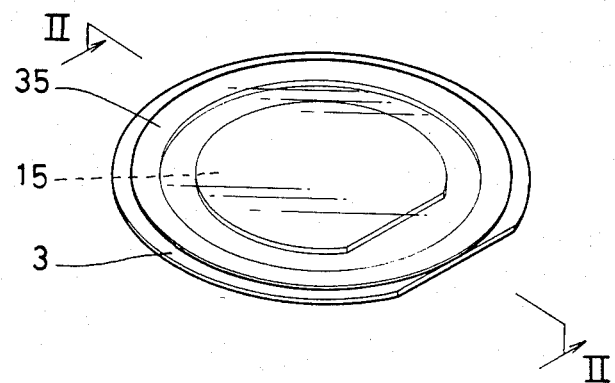
FIG. 1 is a perspective view showing a silicon wafer mounted on a ring carrier with an adhesive film.
Figure 2:
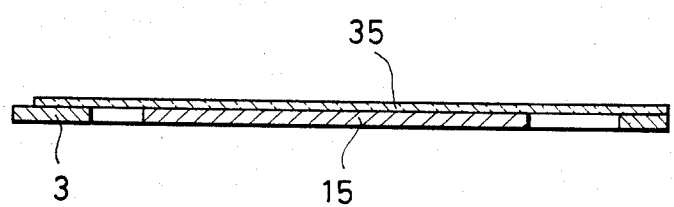
FIG. 2 is a sectional view thereof taken along the line II—II of FIG. 1.

After the sticking means A has been returned to its original position, the cutter supporting plate 44 is put down to its lower operative position shown in FIG. 2. When the handle 51 is pushed down, the cutter 50 of the cutting means B is pressed against the adhesive film 35 stuck on the ring 3. In this condition, the slider 49 is manually moved along the guide rail 47. The cutter 50 will cut off the excess portion of the web of adhesive film 35 when the slider 49 is allowed to make approximately two rounds of the ring 3.

Then the handle 59 of the cutting-off means C is pushed down so as to allow the cutter 57 to cut into one edge of the adhesive film 35. The web of adhesive film 35 is cut transversely when the slider 56 (FIG. 5) is moved along the guide slot 54 (FIG. 3).

The ring 3 and the thin article 15 stuck on the round piece of the adhesive film 35 are then taken out of the ring supporting table 2, and the remainder of of the adhesive film 35 is removed. The end of the web of adhesive film 35 is sucked on the under surface of the tape holder 28. The elevator member 41 is then raised by the air cylinder 40 so as to make the whole apparatus ready for repeating the above-mentioned process once again.

Since the thin article supporting table 7 is resiliently supported by the spring 10, the thin article is protected from damage which would be caused by overload applied thereto when sticking an adhesive film 35 thereon. If there is no need to worry about such damage, the thin article supporting table 7 may be formed integrally with the ring supporting table 2.

What are claimed are:

1. An apparatus for sticking an adhesive film on a ring as a carrier and a thin article such as a silicon wafer comprising:
   a frame;
   a table mounted on said frame for holding the ring thereon;
   a table mounted on said frame for holding the thin article thereon;
   sticking means adapted to move along the top surface of said tables for pressing the adhesive film against the ring and the thin article to stick it thereon;
   a cutter supporting frame pivotally mounted on said frame at one end thereof;
   cutting-out means mounted on said cutter supporting frame for cutting out the web of adhesive film along the outer periphery of said ring; and
   cutting means mounted on said cutter supporting frame for cutting the web of adhesive film transversely.

2. An apparatus as claimed in claim 1, wherein said table for holding the thin article is resiliently supported while said table for holding the ring is fixedly mounted.

3. An apparatus as claimed in claim 1, wherein said table for holding the ring is integral with said table for holding the thin article.

* * * * *